United States Patent [19]
Preston et al.

[11] 3,921,642
[45] Nov. 25, 1975

[54] AUTOMATIC RATE ADJUSTMENT PACER WITH NATURAL RATE SEARCHING MEANS AND METHOD OF OPERATION

[76] Inventors: Thomas A. Preston, 820 37th Ave., Seattle, Wash. 98122; Albert W. Preston, Jr., 111 Ogden Ave., Swarthmore, Pa. 19081

[22] Filed: Sept. 20, 1974

[21] Appl. No.: 507,903

Related U.S. Application Data

[63] Continuation-in-part of Ser. No. 484,561, July 1, 1974, abandoned.

[52] U.S. Cl. ......................................... 128/419 PG
[51] Int. Cl.² ........................................... A61N 1/36
[58] Field of Search .... 128/419 P, 419 PG; 421–423

[56] References Cited
UNITED STATES PATENTS

| | | | |
|---|---|---|---|
| 3,656,487 | 4/1972 | Gobelt | 128/419 PG |
| 3,718,909 | 2/1973 | Greatbatch | 128/419 PT |
| 3,794,045 | 2/1974 | Thaler | 128/419 PG |

*Primary Examiner*—William E. Kamm
*Attorney, Agent, or Firm*—Albert W. Preston, Jr.

[57] ABSTRACT

A demand pacer adapted to normally produce stimulus pulses at a given rate in the absence of detected natural heartbeats, and also having means for searching for the occurrence of natural heartbeats at lower rates in the absence of natural heartbeats. The pacer searching is initiated by detection of a natural heartbeat or by a signal generated independently of any natural heartbeat. During searching the pacer escape interval is lengthened by relatively small steps until a predetermined rate range below the given rate has been searched, and upon detecting a natural heartbeat within said range the pacer escape interval is set to permit continued demand operation within the range.

31 Claims, 4 Drawing Figures

AUTOMATIC RATE ADJUSTMENT PACER WITH NATURAL RATE SEARCHING MEANS AND METHOD OF OPERATION

REFERENCE TO RELATED APPLICATION

This application is a continuation-in-part of our application Ser. No. 484,561, filed July 1, 1974, now abandoned. Any portions of such application not included herein are incorporated by reference.

BACKGROUND OF THE INVENTION

1. Field of the Invention

This invention relates to demand type pacing devices and, more particularly, to demand type pacers having circuitry for varying the escape interval as a means for detecting lower rate natural beats.

2. Background of the Invention

In demand pacing devices, the objective is that stimulus pulses are to be delivered to the patient's heart only in the absence of natural heartbeats. Generally, the demand pacer is designed to deliver a pulse at a predetermined time interval after the last natural heartbeat, and to continue to deliver stimulus pulses at a fixed rate as long as no natural heartbeats are sent. If a heartbeat occurs during the timing interval of the pacing device, it is interpreted as being a natural heartbeat and the pacer generator is "reset" so that it starts its timing cycle over again, i.e., begins anew to measure the timing interval before delivery of the next pulse. The time interval between the moment when the pacer generator is reset and the time when it delivers its next stimulus signal is referred to as the escape interval. In order to detect a natural heartbeat in a conventional pacer, the natural heartbeat must occur within the escape interval, i.e., it must come along at a rate greater than the pacer rate in order to be detected. By example, if the pacer is delivering stimulus pulses at a rate of 70 per minute, corresponding to an escape interval of 0.857 second, a natural heartbeat, in order to be detected, must occur within 0.857 second of the last stimulated heartbeat, which would represent a rate greater than 70. Thereafter, as long as the rate of the natural heartbeats was maintained greater than 70, the demand pacer would be inhibited and not deliver stimulus pulses. However, in such a conventional arrangement, if the natural heartbeat rate dropped below 70, e.g., to 68, it would not and could not be detected, such that the demand pacer would react as though the natural heartbeat had disappeared entirely.

One approach to the above problem would be, of course, simply to set the natural rate of the pacer at the lowest permissible pacing rate. For example, if the pacer were set to produce stimulus pulses at a rate of 50 per minute, natural pacing within the range of 50–70, as well as above 70, would be permitted. However, pacing at such a low rate at all times would be very undesirable from a medical standpoint. The most desirable pacing rate, for situations where the pacer must take over completely, (in either a demand pacer or a continuous-type pacer) is generally considered to be around 70 pulses per minute. Thus, by reducing the fixed pacing rate the problem could be solved technically, but it would be an unacceptable solution for medical purposes.

There are, however, medical reasons to desire that a pacer permit natural pacing at rates below 70. Most patients have rates in the 50's during sleep and other periods of relative bodily inactivity, and as many Pacemaker (Registered Trademark) patients have intermittent or predominant sinus rhythm, it would be advantageous to allow preservation of the natural and more efficient rhythm when it is available, which for many patients could be much of the time. In addition, it is easily recognized that, to the extent that the natural pacing could be preserved even at the lower rates, battery energy would be preserved due to reducing the amount of time during which the stimulus pulses must be delivered.

One type of pacer that attempts to enlarge the range of demand pacing is the "hysteresis" type. For a discussion of the features of this type of pacer, see U.S. Pat. No. 3,794,045, to Thaler. The hysteresis pacer, however, assures a new escape interval corresponding to a lower pacing rate only upon detection of natural beats, and then it makes a discrete jump from the normal rate to the lower rate. The Thaler patent shows a circuit for gradually changing the escape interval, but this is done only so long as natural beats are continuously detected. Thus, the hysteresis pacers are designed to change the escape interval in response to a natural beat, but cannot initiate such a change or continuously carry it out (search) in the absence of detected natural beats.

There thus has been a long felt need in the area of pacing devices, and in particular cardiac pacing devices, for a demand pacer which, when in its normal state of delivering stimulus signals, delivers such signals at the most desirable rate, e.g., 70 ppm, but which concurrently has the capacity to search for the presence of natural heartbeats both above and below the normal rate. Thus, presuming that it would be desirable to permit a natural rate down to a lower limit of 54, the pacer would normally deliver its stimulus signals at a rate of 70 (permitting detection of heartbeats at rates above 70) while searching for natural heartbeats within the rate range of 54–70. Unlike the prior art hysteresis type demand pacers, the desired pacer would have a capability of searching for lower rate natural heartbeats in the absence of detected natural heartbeats.

SUMMARY OF THE INVENTION

It is the primary object of this invention to provide a demand cardiac pacer having means for delivering stimulus pulses at at least a normal rate and being adapted additionally to search for and detect the occurrence of natural heartbeats at a rate within a predetermined range below said normal rate.

It is a further object of this invention to provide a pacer having means to search for and detect the occurrence of natural heartbeats at a rate in a range below a given rate, and means for adapting the pacer to permit natural pacing within such range upon detection of natural heartbeats within such range.

It is a further object of this invention to provide an automatic rate adjustment demand pacer and method which allows emergence of the natural heartbeat as much as possible, thereby optimizing the patient condition and maximizing the power source life.

It is a still further object of this invention to provide a pacer with means for searching for, detecting and identifying the occurrence of natural heartbeats at a rate below the rate corresponding to the normal pacer escape interval, such means being initiated either by detection of a natural heartbeat at a rate above such normal rate or by predetermined program means acting in the absence of any detected natural heartbeat.

In accordance with the above objectives, there is provided a demand pacer having means for delivering stimulus pulses at a normal rate, a searching circuit for searching for, detecting and identifying the occurrence of natural heartbeats at rates within a predetermined range below the normal rate, and means for adapting the pacer to operate with an escape interval permitting natural pacing within said range when natural heartbeats are detected within (or above) said range. Means are provided for initiating the natural heartbeat search either as a function of detected natural heartbeats or in accordance with a predetermined program.

DESCRIPTION OF THE PREFERRED EMBODIMENTS

Figure 1:
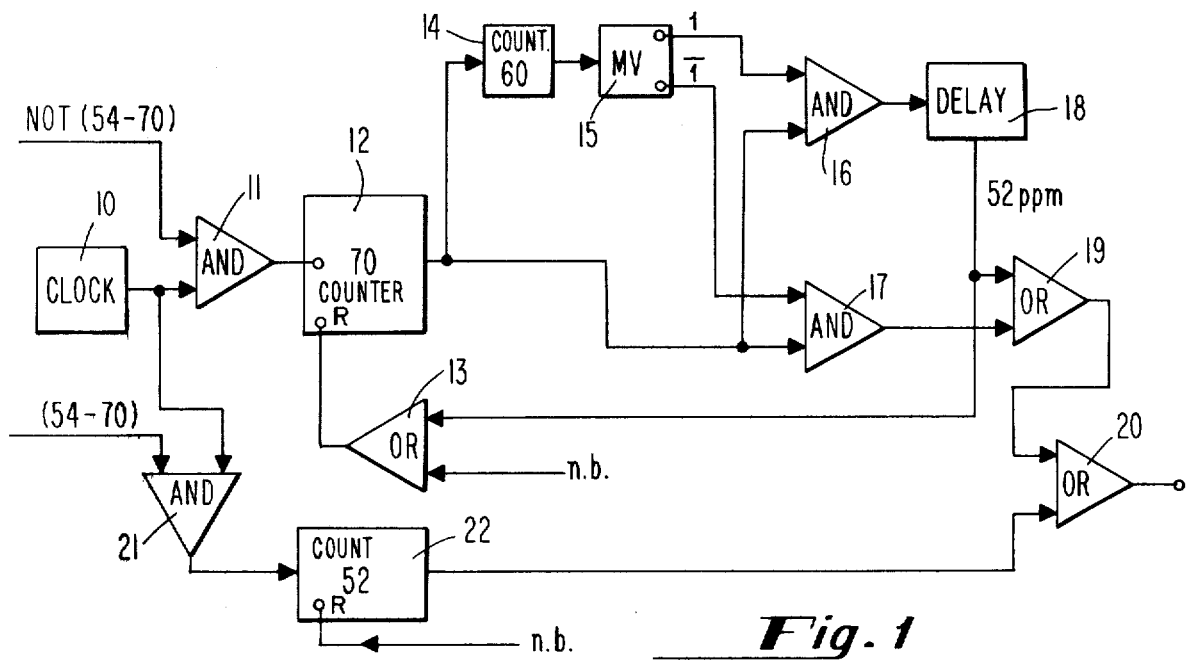
FIG. 1 is a block diagram showing a first embodiment of the pacer of this invention.

Referring now to FIG. 1, there is shown a block diagram of a first embodiment of the improved pacer of this invention, wherein the normal pacer rate is at a fixed rate (70 ppm for this illustration) and the rate is periodically slowed to a lower rate (i.e., 52) to permit searching for natural heartbeats between the normal rate and the lower rate. A clock generator 10 is a normal oscillator circuit which produces pulses at a fixed rate. The output of the clock generator is connected through two paths to counter 12 and counter 22 respectively, each of which counters is operative when the other is inoperative, as described further below.

In the first path, the clock pulses are connected to AND circuit 11, circuit 11 having a second input which is designated NOT (54–70). This signal is at a high state, permitting conduction of clock pulses through AND gate 11, when the detected heartbeat (stimulated or natural) rate is not within the range of 54–70 (the rate is detected as NOT 54–70 when it is at the normal stimulus value of 70). The output of gate 11 is connected to the input of counter 12. Counter 12 is a normal shift register type counter, which in effect divides the pulse rate from clock generator 10. The rate of generator 10 and amount of division provided in counter 12 is combined to produce an output from counter 12 at a rate of 70 pulses per minute. Counter 12 has a reset terminal which is driven by the output of OR gate 13. The output of counter 12 is fed to the pacing electrodes through one of two subpaths. Following the first subpath, the pulses at the rate of 70 ppm are connected to a first input terminal of AND gate 17, the second input terminal of which is connected to one of the outputs ($\bar{1}$) of a monostable multivibrator 15. Such second input is normally high, so that AND gate 17 normally permits the 70 ppm stimulus pulses to proceed through to a first input terminal of OR gate 19. The output of OR gate 19 is connected to a first input terminal of OR gate 20, from whence it is connected (with suitable additional amplification and processing as may be desired) to the pacing electrodes.

The second subpath from the output of counter 12 is through counter 14, which, in this illustration, counts to 60, and delivers one output pulse for every 60 input pulses. The output from counter 14 is connected to circuit 15, which is a two state device which is driven to an unstable state for a predetermined period of time by each input pulse. Normally, the output terminal of circuit 15 which is designated 1 is low, and the output terminal designated $\bar{1}$ is high. In this illustration, upon receipt of an input signal, the output of circuit 15 flips to its opposite state for about 2 escape intervals. The output of circuit 15 designated 1 is connected through to a first terminal of AND circuit 16, the second input terminal of which is connected directly to the output of counter 12. The output of gate 16 is connected to a delay circuit 18, which in this illustration provides delay of approximately 0.411 second (corresponding to the difference between the escape interval of a 70 ppm signal and that of a 52 ppm signal). The output of delay circuit 18 is connected to one of the input terminals of gate 19, as well as to one of the input terminals of OR gate 13. The other input terminal of gate 13 is connected to receive the "natural heartbeat" signal, which represents detection of a natural heartbeat. Circuitry for detection of a natural (or spontaneous) heartbeat is well known in the art. See, for example, U.S. Pat. No. 3,794,045.

Figure 4:
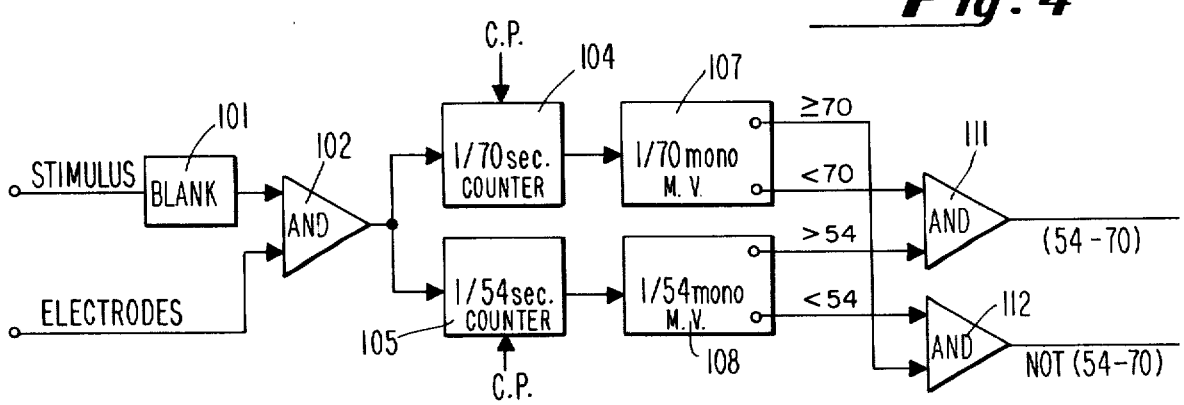
FIG. 4 is a block diagram showing logic circuitry for providing heartbeat rate logic signals, as used in this invention.

The output of clock generator 10 is also connected to a first input of AND gate 21, which gate has a second input signal which represents a condition designated (54–70), meaning that the sensed heartbeat (natural or stimulated) has a rate within the range of 54–70 (but not including 70). The output of counter 22 is connected to one of the inputs of gate 20. The signals (54–70) and NOT (54–70) may be obtained by the well known technique based upon measuring the time interval of the last two signals, developing a voltage proportional to such time interval and comparing such voltage with reference voltages for time intervals of 54 and 70 respectively. An alternate specific means of developing these signals is shown in FIG. 4.

The manner of operation of the embodiment of FIG. 1 can now be understood. In practice, when the pacer is providing stimulus pulses at 70 the detected range is NOT (54–70), and AND gate 11 passes signals while AND gate 21 blocks signals. Thus, counter 12 is counting, producing output pulses at the rate of 70 ppm. These pulses normally pass through gates 17, 19 and 20 and are delivered to the pacing electrodes, thereby providing patient pacing at the normal rate of 70 ppm. However, approximately every minute, or when counter 14 counts to 60, circuit 15 is driven to its alternate state, such that gate 17 blocks the counter pulses and gate 16 passes them. The first pulse passing through gate 16 is delayed such that it is produced at the input to gate 19 a time period following the last prior pulse which corresponds to a slower rate of 52 ppm. At the same time such first slower rate pulse is delivered to the pacing electrodes, counter 12 is reset (through gate 13). One-seventieth of a minute after being reset counter 12 delivers another pulse, which is similarly delayed, so that the second delayed pulse is delivered 1/52 minute after the first delayed pulse. In this way, two successive stimulus pulses are delivered at an effective rate of 52 ppm. Thereafter, circuit 15 resets to its stable state, and the cycle repeats. It is to be observed that the timing of circuit 15 as well as the counting of circuit 14 can be set in any combination, so that the time interval between searches can be set as desired, and the number of stimulus pulses delivered to the pacer output during the search period can also be set as desired.

During the search period, in the absence of a detected natural beat, the search rate and the detected rate is 52, and consequently counter 12 continues to count, and counter 22 is not counting. If a natural heartbeat comes along at a rate greater than 70, counter 12 is reset and continues to operate. However, if one or more natural heartbeats are detected within the range of 54–70, the logic causes a switch in operation such that counter 22 operates and counter 12 does not operate. As long as the natural heartbeat is sensed within the range of 54–70, counter 22 receives clock pulses. However, it is continuously reset, and does not provide output stimulus pulses. The first time no natural beat is sensed within this range, counter 22 puts out a stimulus pulse, following which the rate is sensed to be 52, or not within the range of 54–70, and counter 12 resumes operation (with counter 22 stopping). After 60 stimulus pulses have been counted, the search cycle is repeated. The pacer thus provides for periodically searching within the range of 54–70 by generating and delivering search stimulus pulses at a search rate below such range, and by automatically adjusting the "fixed" pacer rate to a value below such range when and as long as natural heartbeats are detected with a rate within such range. Stating it another way, the pacer escape interval is reset to 1/52 of a second and maintained at such value as long as natural heartbeats are detected in the 54–70 range.

Figure 2:
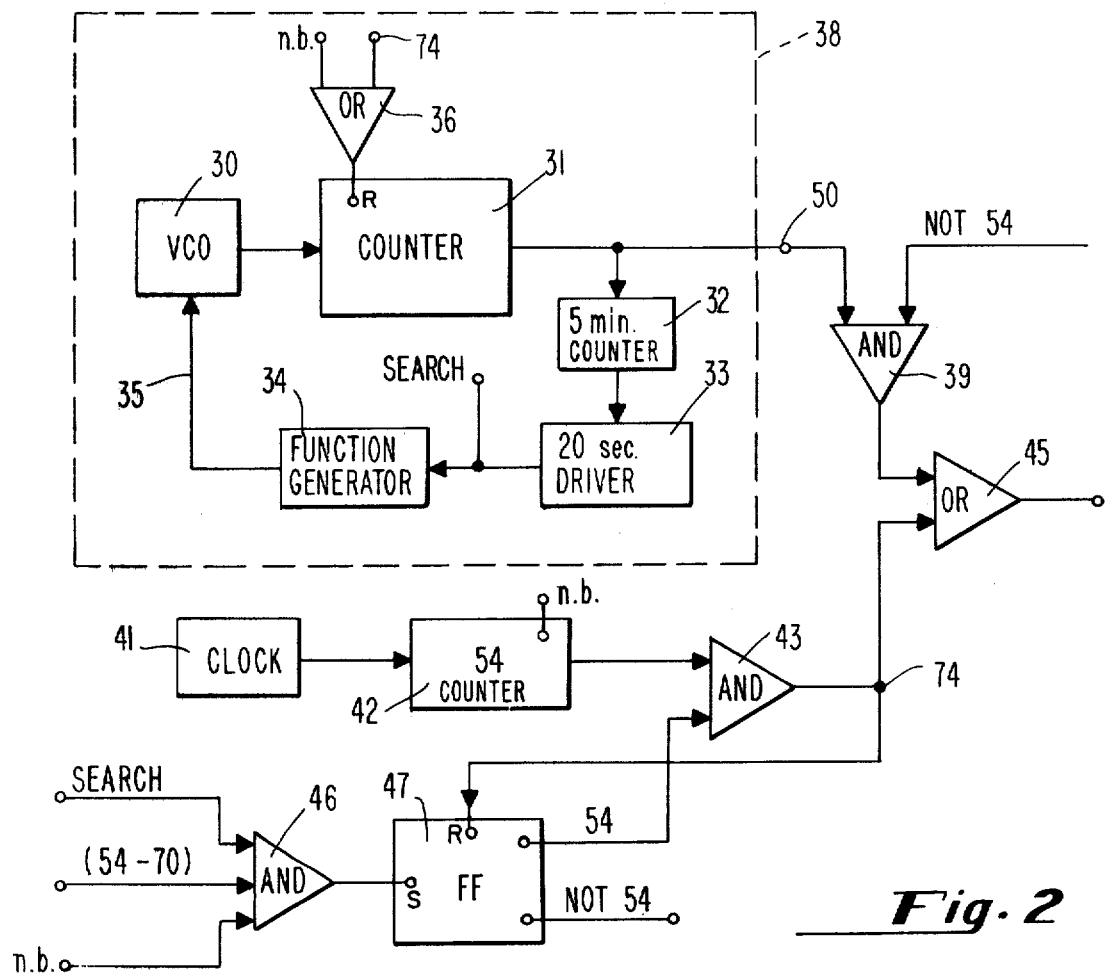
FIG. 2 is a block diagram showing an analog embodiment of the pacer of this invention.

Referring now to FIG. 2, there is shown an embodiment in analog form for periodically programming the stimulus rate of the pacer to slow down from a normal rate of 70 to a minimum rate of 54, and then increase back up to 70, thereby providing the search portion of the programmed rate cycle. The desired manner of rate change is linear from 70 down to 54, and then linear from 54 back up to 70. The exact manner in which the rate is changed can be adapted to virtually any form desired, i.e., the rate could hold at 54 (or any predetermined low limit rate) for a period of 5 or 10 seconds, if desired, prior to going back up to 70. The exact form of the programmed search is determined by the function generator as described in connection with FIG. 2.

Still referring to FIG. 2, there is shown within generator block 38 a voltage controlled oscillator 30 (VCO), which produces output pulses at a rate which can be varied by the input signal delivered on control signal line 35. The output of the VCO is connected to a counter 31, which effectively divides the pulses delivered from the VCO. When the input voltage on line 35 is at its normal level, the rate of the VCO combined with the counter produce output signals at a normal, or fixed rate of 70, which (after appropriate processing) are in condition for delivery to the pacing electrodes. In addition, the output signals from counter 31 are connected to a counter 32, which in this illustration is designated a 5 minute counter (i.e., counts 5 × 70 pulses). Upon counting 5 minutes worth of stimulus pulses, counter 32 produces an output which drives circuit 33, which in turn produces an output lasting for a predetermined time limit, in this example 20 seconds. The 20 second output of circuit 33 (the SEARCH signal) drives a function generator 34, which produces a variable output voltage so as to provide the corresponding change in the frequency of output of the VCO. Since the relationship between the frequency of oscillator 30 and the control voltage on line 35 is substantially linear, the output of function generator 34 is designed to produce the desired variation of stimulus rate during the 20 second drive time. Function generator 34 may be chosen from any one of a number of standard function generators. Function generators are well known in the art, and the design of same is well within the skill of one of ordinary skill in this art. Conventional function generators such as have been used in analog computers for well over a decade comprise a driving signal, such as a ramp voltage, which is inputted across a diode network, the diodes being biased to provide a straight line segment function which can appproximate virtually any desired function.

It is to be noted that counter 31, as well as counter 32 and driver 33, are reset by the occurrence of a natural beat, such that the programmed search is terminated by a natural beat. Generator portion 38 is logically combined with a 54 ppm generator which comprises clock generator 41 and counter 42. The output of counter 42 is logically gated to the pacing electrodes through AND gate 43 and OR gate 45 whenever the "54" logic signal enables gate 43, and the output of generator 38 (at node 50) is logically gated through gates 39 and 45 to the pacing electrodes whenever the "NOT 54" logic signal enables gate 39. The 54 and "NOT 54" signals are generated by AND gate 46 and Flip Flop 47. Gate 46 is enabled by the simultaneous appearance of a SEARCH signal, a (54–70) signal, and an nb signal. The output from 46 sets Flip Flop 47, producing a high output at the 54 terminal, and a low output at the NOT 54 terminal. When counter 42 produces an output pulse (due to the absence of a natural beat), the signal at node 74 resets Flip Flop 47, driving the NOT 54 terminal high and the 54 terminal low. Either a nb or a signal at node 74 resets counter 31 through OR gate 36.

Figure 3:
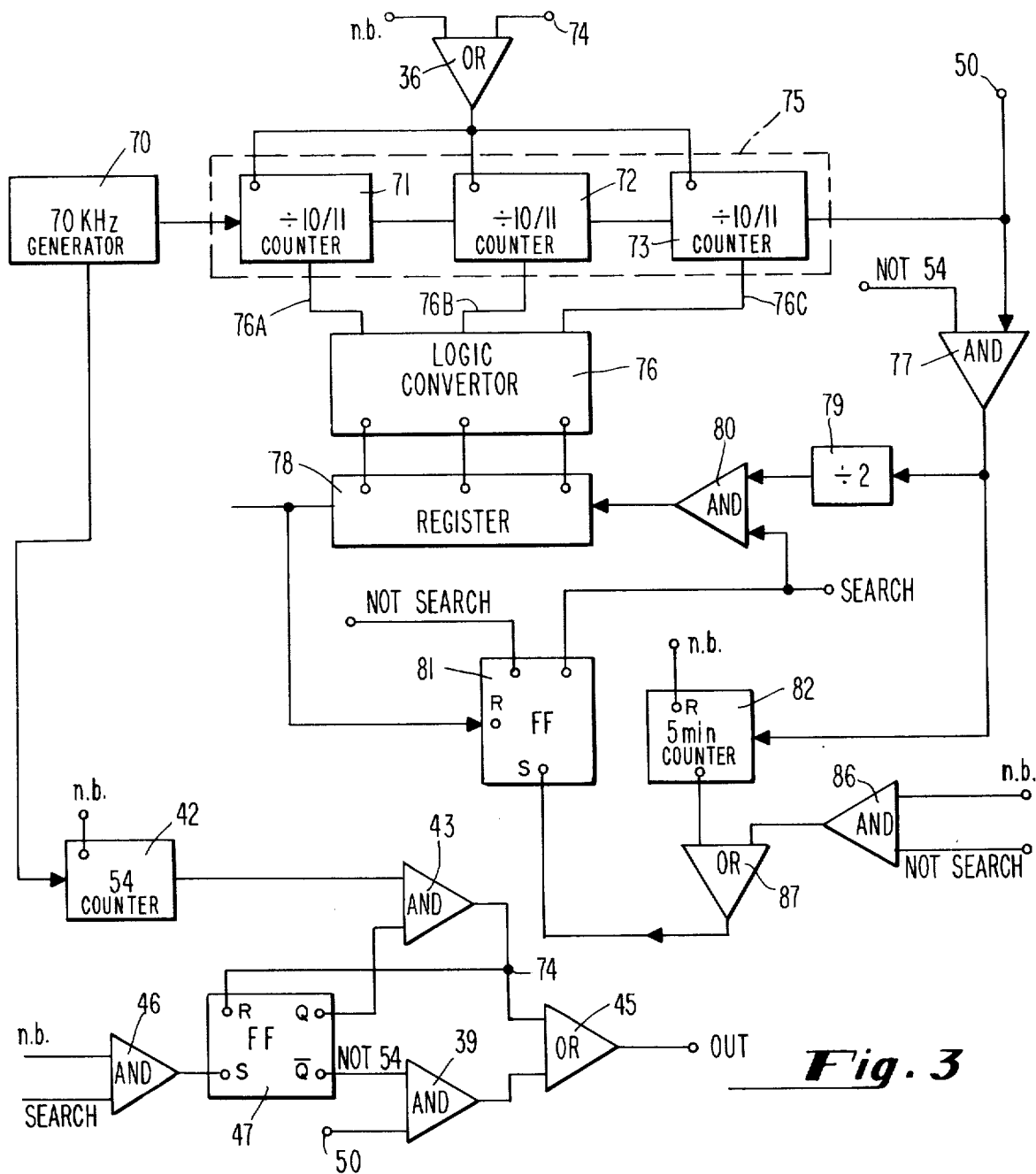
FIG. 3 is a block diagram of another digital embodiment of the pacing generator of this invention.

Referring now to FIG. 3, there is shown a digital embodiment of the general type of circuit as shown in FIG. 2. In this embodiment, digital logic is used to provide a programmed variation in the stimulus frequency similar to that shown in the analog embodiment of FIG. 2, except that the frequency (rate) is changed in discrete steps. The pacer normally operates at a fixed rate of 70, absent a detected natural heartbeat. When it goes into its "search" routine, it first gives two stimulus pulses at a rate of 63.6 per minute, then two at a rate 57.8 per minute, then four at a rate of 52.6, two more at a rate of 57.8, two more at 63.6, and then it returns to a steady fixed rate of 70. See Table 1. In this embodiment, the pacer provides the fixed rate of 70 for a period of 5 minutes, or until a natural beat is detected, following which it goes through its search cycle. The five minute interval, as well as the specific rates and step changes of the rates, are design variables and are used for illustrative purposes only.

This digital embodiment design takes advantage of a special commercially available IC chip (Fairchild 95H90) which provides what is called a divide by 10/11 counter, which normally divides the input pulses by 10, but which divides by 11 when a high signal is connected to one of its terminals. The three divide by 10/11 elements are connected with other logic blocks so that, during the search cycle, for two pulses one of the three counters divides by 11, producing a rate of 63.6 instead of 70; for the next two pulses two of them divide by 11 (instead of by 10) producing the rate of 57.8; then all three divide by 11 for four pulses, producing the rate of 52.6; and then they reverse that sequence until all three resume dividing by 10, producing the steady state rate of 70.

Referring specifically to FIG. 3, there is shown a fixed rate generator 70, which in this illustration operates at 70 kHz. The output pulses are passed through the three successive divide by 10/11 counters 71, 72 and 73 respectively, the output of the last counter being connected to output terminal 50. It is to be noted that the generator portion indicated as 38 in FIG. 3 is an alternate digital equivalent of the analog generator portion 38 as shown in FIG. 2, and operates logically in combination with a generator providing a lower fixed rate, e.g., 54 ppm.

The output pulses at terminal 50 are also connected through AND gate 77 to the inputs of a divide by 2 counter 79, and a divide by 350 counter 82 (which is effectively a 5 minute counter). When 5 minutes have been counted, an output pulse is produced and connected to a first input of OR gate 87. The other input to gate 87 is provided from the output of AND gate 86, which has nb and "NOT SEARCH" inputs, such that it produces an output when a natural beat is detected while the pacer is not in the search mode. The NOT SEARCH signal is taken from flip-flop 81, and is high when the flip-flop is not set. The output of gate 87 is connected to the set terminal of flip-flop 81, setting its output to a high condition. The output of flip-flop 81 is connected to one input terminal of AND gate 80, the other input terminal being connected to the output of divide by 2 counter 79. The output of gate 80 is in turn connected to the input of register 78, which in this example is a three bit register which constitutes a divide by 8 counter. That is to say, circuit 78 comprises three series connected two state devices (flip-flops). Outputs from each of the two state devices of circuit 78 are parallel connected to a logic converter 76, which in turn has three outputs which are connected to dividers 71, 72 and 73 respectively. When a binary 7 is produced by divider 8, a signal is coupled back to reset flip-flop 81 to its initial state.

Logic converter 76 performs the conversions as shown in Table I. Thus, when register circuit 78 is set to its initial condition, all three of its flip-flops are in a zero state, and the logic converter provides zero state outputs (low voltage outputs) to each of the three counters, such that all three counters operate in a normal divide by 10 manner, producing an output rate of 70. After a first pulse has come through gate 80, the first flip-flop of divider 78 is at a high state, and logic converter 76 produces a high voltage on the line connected to divider 73, such that it then operates in a divide by 11 condition as long as circuit 78 remains in that state. When the second pulse comes through gate 80, converter 76 provides a high voltage to both dividers 72 and 73, causing the output rate to be reduced to 57.8. Upon the third pulse being received by circuit 78, converter 76 provides a high voltage to all three dividers, resulting in an output rate of 52.6. Likewise, the converter logic causes the output rate to step back up to the normal rate of 70.

In practice, the logic converter 76 may be any conventional logical design. Such logic designs are well known in the art and it is a matter of design expediency as to how this logic conversion is performed. By way of example, the conversion from a register output of 010 to a converter output of 011 may be performed by inverting the output from the first and third flip-flops of 78, and taking such inverted signals and passing them together with the signal from the second flip-flop through an AND gate. The output of the AND gate is then connected to the terminals of counters 72 and 73, and also inverted and then connected to terminal 71. Similar routines are arranged for each of the other possible output conditions of divider 78, and OR-gated through to the input terminals of the respective counters so that for any given output of divider 78 the proper signals are delivered to the counters. It is understood that other logical arrangements can be made, this arrangement being given only for illustrative purposes.

In practice, it is seen that every five minutes, or when a natural beat is detected while a search is not in progress, gate 80 is enabled by setting of flip-flop 81. Every other output pulse is passed through gate 80 to divider 78, such that register 78 remains in a given combination for two output pulses. As the pulses are stepped through register 78, the operating conditions of counters 71–73 change as is seen in Table I, such that the pulse delivery rate steps down from 70 to 52.6 and then steps back up again to 70, whereafter the output rate is again fixed at 70 until the next cycle begins. It is understood that, by suitable arrangement of the logic circuitry, any manner of programming the rate change can be arranged. It is desirable that the rate not be changed by too great an amount in any given step, so as to avoid patient discomfiture.

TABLE I

| | Logic Conversion | | |
|---|---|---|---|
| Output of Divider 78 | Output of Converter 76 | State of Dividers 71,72,73 | Rate (ppm) |
| | | divide by | |
| 000 | 000 | (10 × 10 × 10) | 70.0 |
| 001 | 001 | (10 × 10 × 11) | 63.6 |
| 010 | 011 | (10 × 11 × 11) | 57.8 |
| 011 | 111 | (11 × 11 × 11) | 52.6 |
| 100 | 111 | (11 × 11 × 11) | 52.6 |
| 101 | 011 | (10 × 11 × 11) | 57.8 |
| 110 | 001 | (10 × 10 × 11) | 63.6 |
| 111 | 000 | (10 × 10 × 10) | 70.0 |

Still referring to FIG. 3, there is shown in the block diagram circuitry for changing the escape interval when a natural beat is detected during search. The "SEARCH" signal, taken from flip-flop 81, is high when 81 is set. In this condition, when an nb signal is received, an output pulse from gate 46 sets flip-flop 47, producing a 54 signal which enables gate 43 and disenables gate 39. Counter 42, connected to counter 70, is designed to produce output pulses at a rate of 54 ppm, which pulses are gated through gate 43 when it is enabled. Under these conditions, the signal at node 50 is blocked at gate 39, and the pacer is in its "54 mode". Normally, natural beats reset counter 42 before it can produce an output pulse. However, if the natural beat is lost, an output pulse does appear at node 74, resetting both flip-flop 47 and counter 75, so that normal "70 mode" operation is resumed.

In practice, circuit 75 may be "pre-loaded" through a converter, a technique which is well known in the art. In this arrangement, circuit 75 is a conventional counter, each stage of which may be set to a 0 or 1 condition, such that with proper associated logic circuitry the output pulse signal can be adjusted to any one of a plurality of predetermined rates. Register 78 can also be designed with a desired number of stages and combined with an appropriate logic converter 76 to give any desired program of rate changes through the search cycle.

Referring now to FIG. 4, there is shown a block diagram of circuitry for obtaining signals which determine whether the detected heartbeat rate (stimulated or natural) is within the range of 54–70 (but not including 70) or outside of such range (including 70). Pacer stimulus signals are connected through blanking circuit 101, which provides means for blocking out stimulus current artifact signals. The blanking circuit 101 may suitably be a conventional monostable multivibrator which would provide a low output signal for a predetermined time period after delivery of a pacer stimulus. Thus, the output of blanking circuit 101, which is connected as a first input to AND gate 102, is high except for such blanking period immediately following delivery of a pacer stimulus. The other input to AND gate 102 is the electrode pickup. The output of gate 102, since it excludes pacer stimulus signals which are being delivered, represents heartbeat signals (natural or stimulated). The heartbeat signals are delivered to interval detection blocks 104 and 105, which detect intervals corresponding to rates of 70 and 54 respectively. Blocks 104 and 105 are suitably counters which receive input clock signals from a fixed rate generator being utilized in the pacer circuitry (e.g., counter 70). Each signal into counter 104 resets the counter, and if another signal does not come along within 1/70 second, an output signal is produced which is connected to circuit 107. Circuit 107 is a two state device, preferably a monostable multivibrator which, when triggered with an input signal from circuit 104, goes into one of its two states for 1/70 second. Thus, if an output comes from circuit 104 indicating a rate less than 70, the "less than 70" output of 107 goes high and the other output of 107 goes low. After 1/70 second, the states of 107 flip back to their stable condition. However, if the next succeeding heartbeat is again at a rate of less than 70, 107 would immediately be flipped again, such that as long as the heartbeat rate was less than 70, the less than 70 output of 107 would remain high. Similarly, circuit 108, which receives outputs from circuit 105, measures 1/54 second, and produces output signals indicating that the heartbeat rate is greater than or less than 54. The outputs of circuits 107 and 108 respectively are connected as shown to AND gates 111 and 112, to produce (54–70) and not (54–70) logic signals.

It is to be understood that the breadth of this invention is not limited by the illustrations presented herein. For example, it has been assumed that one requirement for initiating a rate search, or switching to a greater escape interval, is the occurrence of just one spontaneous beat. In this regard, a single premature ventricular contraction could result in a period of slow pacing, which, if this were to happen frequently, could result in pacing at a slow rate for an excessive amount of time. An alternative is to require detection of two consecutive spontaneous natural beats in order to initiate a rate search, or 2 consecutive natural beats with an escape interval corresponding to 54 (or another designated rate), in order to reset to the lower demand rate of 54. This may be accomplished by first passing the "natural heartbeat" signal through a divide by 2 counter, so that two such beats must be detected before the logic circuitry acts as though a natural beat were detected. The divide by 2 counter may be reset upon delivery of a stimulus pulse so that two consecutive natural heartbeats must have to be detected before the demand rate is reset to a lower figure. In this regard, where the term "natural beat" is used in this specification, it embraces also signals derived from detected natural beats.

While specific embodiments have been set forth herein, it is noted that many circuit variations may be designed to accomplish equivalent functions, and be within the scope of the claimed invention. Further, it is understood that state of the art design techniques for providing proper supply voltages, adjusting signal timing to account for circuit-introduced delays, etc., are not included herein because they are a matter of design expediency and are well known in the art, and to include such would unnecessarily encumber this disclosure without contributing any information necessary to enable one of ordinary skill in this art to practice the invention.

As used herein, the term "searching" refers to the capacity of the pacer to search, or look for the occurrence of natural heartbeats at a rate below the normal rate at which stimulus pulses are delivered, in the absence of any detected natural heartbeat. Even where the search is initiated by detection of a natural beat, the increase in escape interval is carried out in the absence of any natural beat. Thus, searching, as the term is used herein, differs from prior art hysteresis pacers in that the escape interval is increased in a plurality of steps, such increases being continued in the absence of intervening natural beats.

The embodiments disclosed herein are the preferred embodiments for such searching, but it is recognized that the searching could be done in other equivalent ways in accordance with the disclosure. For example, where it is desired to permit natural heartbeats at rates down to a predetermined minimum such as 50, the pacer can incorporate a fixed rate generator producing stimulus pulses at 50 ppm, and modify the output rate up to 70 in absence of any natural beat, such that 50 would be the stable circuit rate and rate deviations would be programmed relative to 50. As compared to the embodiments shown, this would involve a difference only of design expediency, and would still involve searching as that term is used herein. The searching feature of this invention provides the means for automatically enabling a pacer, either implanted or external, to permit natural pacing over any desired rate range while also enabling the pacer to provide stimulus pulses at any desired fixed rate within such range in the absence of natural heartbeats within such range.

As claimed hereinafter, the pacer of this invention is adapted to interface with a patient through a suitable electrode lead (catheter) arrangement. The electrodes of the catheter are electrically connected to the pacer, for detection of heartbeats, and the searching means, as described and claimed herein, is adapted to receive signals from the electrodes. Likewise, the stimulus pulses delivered to the pacer output are electrically connected to the electrodes positioned in the heart.

We claim:

1. A demand pacer adapted to detect natural heartbeats, and to deliver stimulus signals in the absence of detected natural heartbeats, said demand pacer being operative in combination with means for delivering signals to and receiving signals from a patient's heart, said pacer comprising:
   a. stimulus means for delivering signals, said stimulus signals normally being delivered at a rate at least as great as a predetermined normal rate;
   b. means for detecting the occurrence of natural heartbeat signals;

c. said stimulus means including searching means for automatically searching for the occurrence of natural heartbeats at a rate within a predetermined range below said normal rate, said searching including decreasing said delivered stimulus signal rate while stimulus pulses are being delivered; and d. means for inhibiting the delivery of signals from said stimulus means in response to the detection of natural heartbeats, said inhibiting means being continuously operative during said searching as well as during said normal delivery of stimulus signals, thereby permitting natural pacing within said predetermined range as well as above said normal rate in response to the occurrence of natural heartbeats.

2. The pacer as described in claim 1, wherein said searching means further comprises means for initiating searching independently of the detection of natural heartbeat signals.

3. The pacer as described in claim 2, wherein said searching includes descreasing said rate through said predetermined range over a plurality of stimulus signals, whereby the change in stimulus rate of successive delivered stimulus signals during seaching is of an amount less than said range.

4. The pacer as described in claim 2, wherein said searching means comprises means for searching according to a predetermined program, and wherein the difference in rate between successive delivered stimulus signals of decreasing rate during said search is limited to an amount less than said search range.

5. The pacer as described in claim 1, wherein said searching means performs the function of maintaining said stimulus rate at a predetermined rate below said normal rate while a plurality of stimulus pulses are delivered.

6. The pacer as described in claim 1, comprising means for detecting the occurrence of natural heartbeat signals at rates above said normal rate and for generating signals representative of such occurrence, and initiating means for initiating said searching in response to said representative signals.

7. The pacer as described in claim 6, further comprising means for initiating said searching independently of the detection of natural heartbeat signals.

8. The pacer as described in claim 1, wherein said stimulus means has an adjustable escape interval, and comprising means for adjusting said escape interval in response to the detection of natural heartbeats, thereby permitting natural pacing within said predetermined range, and wherein said searching means includes program means for sequentially decreasing and increasing said delivered stimulus rate according to a predetermined program.

9. The pacer as described in claim 8, comprising interrupt means for interrupting said searching when said escape interval is adjustable in response to the detection of a natural heartbeat.

10. The pacer as described in claim 9, comprising re-entry means for re-entering said predetermined program following failure to detect a natural heartbeat while said pacer escape interval is adjusted to permit natural pacing in said predetermined range.

11. The pacer as described in claim 1, wherein said searching means performs the function of decreasing said delivered stimulus signal rate in the absence of detected natural heartbeats.

12. The pacer as described in claim 1, comprising initiating means for initiating said searching independently of the detection of natural heartbeats.

13. The pacer as described in claim 1, wherein said searching means includes means for increasing said delivered stimulus signal rate back to said normal rate after delivering said plurality of stimulus signals.

14. A demand type pacer operative in combination with means for delivering stimulus signals to and receiving signals from a patient's heart, comprising stimulus means for delivering stimulus signals and including generator circuitry adapted to generate stimulus signals over a range of rates including a normal rate, inhibit means for inhibiting delivery of said stimulus signals upon the occurrence of natural heartbeats, said stimulus means including means for searching for the occurrence of natural heartbeats at rates throughout a predetermined rate range, said predetermined range being below said normal rate, said searching means being automatically operative to decrease the rate of said delivered stimulus signals during delivery and maintain a decreased rate for at least a plurality of delivered stimulus pulses in the absence of detected natural heartbeats.

15. The pacer as described in claim 14, comprising means for initiating said searching in response to a detected natural heart rate at a rate above said range.

16. The pacer as described in claim 15, comprising further means for initiating said searching independently of detected natural heartbeats.

17. The pacer as described in claim 16, wherein said searching means comprises means for searching through said range over a plurality of delivered stimulus signals, whereby the stimulus rate change at each successive signal during searching is limited to an amount less than said range.

18. The pacer as described in claim 14, comprising adjusting means for adjusting the escape interval of said stimulus means to a value corresponding to a rate below said range when natural heartbeat signals are received during said searching.

19. A method of demand pacing of a physiological system, utilizing a pacer having stimulus generator circuitry and apparatus for delivering signals to and receiving signals from said system, comprising:

a. normally generating stimulus pulses with said generator circuitry at a first fixed rate and delivering said pulses to a predetermined location in said physiological system;

b. detecting the occurrence of natural signals in said physiological system;

c. automatically searching for the occurrence of said natural signals at a rate within a predetermined rate range below said fixed rate, said searching being performed in the absence of detected natural signals and including decreasing the rate of said generated and delivered stimulus pulses and generating and delivering a plurality of said stimulus pulses at a rate below said normal rate; and d. inhibiting the generation and delivery of stimulus pulses in response to the detection of natural signals.

20. The method as described in claim 19, wherein said searching step comprises:

a. decreasing the rate of the generated and delivered stimulus pulses, over a plurality of such delivered pulses;

b. maintaining generation and delivery of said stimulus pulses at a second fixed rate below said first fixed rate for a plurality of such pulses; and c. increasing the rate of the generated and delivered stimulus pulses until said rate returns to said first fixed rate.

21. The method as described in claim 20, comprising generating an initiating signal as a predetermined function of detected natural signals, and initiating said searching with said initiating signal.

22. The method as described in claim 19, comprising identifying when detected natural signals occur at a rate within said predetermined rate range and changing the escape interval of said pacer in response to said identification, said changed escape interval corresponding to a rate below said first fixed rate.

23. The method as described in claim 22, comprising detecting the absence of natural signals when said pacer is operating at said changed escape interval, and increasing the rate of the stimulus signals generated and delivered following said detected absence.

24. The method as described in claim 19, comprising continuously monitoring for natural signals while searching, inhibiting delivery of stimulus pulses as soon as a natural signal is detected while searching, and continuing such inhibiting as long as natural signals are detected.

25. The method as described in claim 24, comprising initiating said searching as a predetermined function of delivered stimulus pulses.

26. The method as described in claim 19, comprising utilizing an implanted pacer, and wherein said automatic searching is performed entirely by said implanted pacer.

27. Demand pacer apparatus adapted to operate in combination with an electrode system connected to a patient, comprising:

stimulus means for normally continuously delivering stimulus signals to said electrode system;

means for monitoring signals from said electrode system representative of natural signals from said patient;

means responsive to said monitored natural signals for inhibiting delivery of a stimulus signal following the occurrence of a natural signal, whereby stimulus signals are delivered only in the absence of monitored natural signals; and said stimulus means comprising rate means for changing the rate of said delivered stimulus signals, said changing function including decreasing said rate over a predetermined number of successive delivered stimulus signals while said monitoring means and said inhibiting means are continuously functional.

28. The apparatus as described in claim 27, wherein said rate means comprises program means for initiating said changing independently of any received signal.

29. The apparatus as described in claim 28, wherein said program means carries out the function of decreasing said rate to a predetermined low rate and then increasing said rate back to a normal fixed rate, said decreasing and increasing being done in accordance with a predetermined program.

30. The apparatus described in claim 29, wherein said rate means includes means for interrupting said program and adjusting the escape interval of said stimulus means to a predetermined value upon inhibiting delivery of a stimulus signal, and resuming said program following cessation of such inhibiting.

31. The apparatus as described in claim 27, wherein said rate means is further characterized by performing the function of cycling the rate of delivered stimulus signals down and up through a predetermined rate range in accordance with a predetermined program, and said rate means comprises means for automatically repeating said cycling in accordance with a second predetermined program.

* * * * *